United States Patent [19]

Premoli et al.

[11] Patent Number: 4,626,629
[45] Date of Patent: Dec. 2, 1986

[54] DIGITAL MULTIFREQUENCY SIGNAL RECEIVER

[75] Inventors: Giacomo Premoli; Giacomo Cannalire, both of Milan, Italy

[73] Assignee: GTE Communication Systems Corporation, Northlake, Ill.

[21] Appl. No.: 681,755

[22] Filed: Dec. 14, 1984

[51] Int. Cl.[4] ............................................. H04M 1/50
[52] U.S. Cl. ................................... 379/386; 328/138; 340/825.73; 370/110.3
[58] Field of Search ................ 179/84 VF; 324/78 F, 324/78 D; 328/138; 340/825.73, 825.74, 825.48; 370/110.3

[56] References Cited

U.S. PATENT DOCUMENTS 4,395,595  7/1983  Nishitani et al. ............... 179/84 VF
4,484,035  11/1984  Graham et al. ................ 179/84 VF Primary Examiner—James L. Dwyer
Attorney, Agent, or Firm—Charles A. Doktycz

[57] ABSTRACT

A digital multifrequency receiver circuit of the type employed between telephone system central offices, arranged to provide a faster response to received signals by processing the received signal tones digitally. The faster response resulting from the elimination of automatic gain control circuits and the use of a fixed gain amplifier used only when the received signal is below an acceptable level and the provision of a variable threshold to the individual frequency comparator circuits.

12 Claims, 2 Drawing Figures

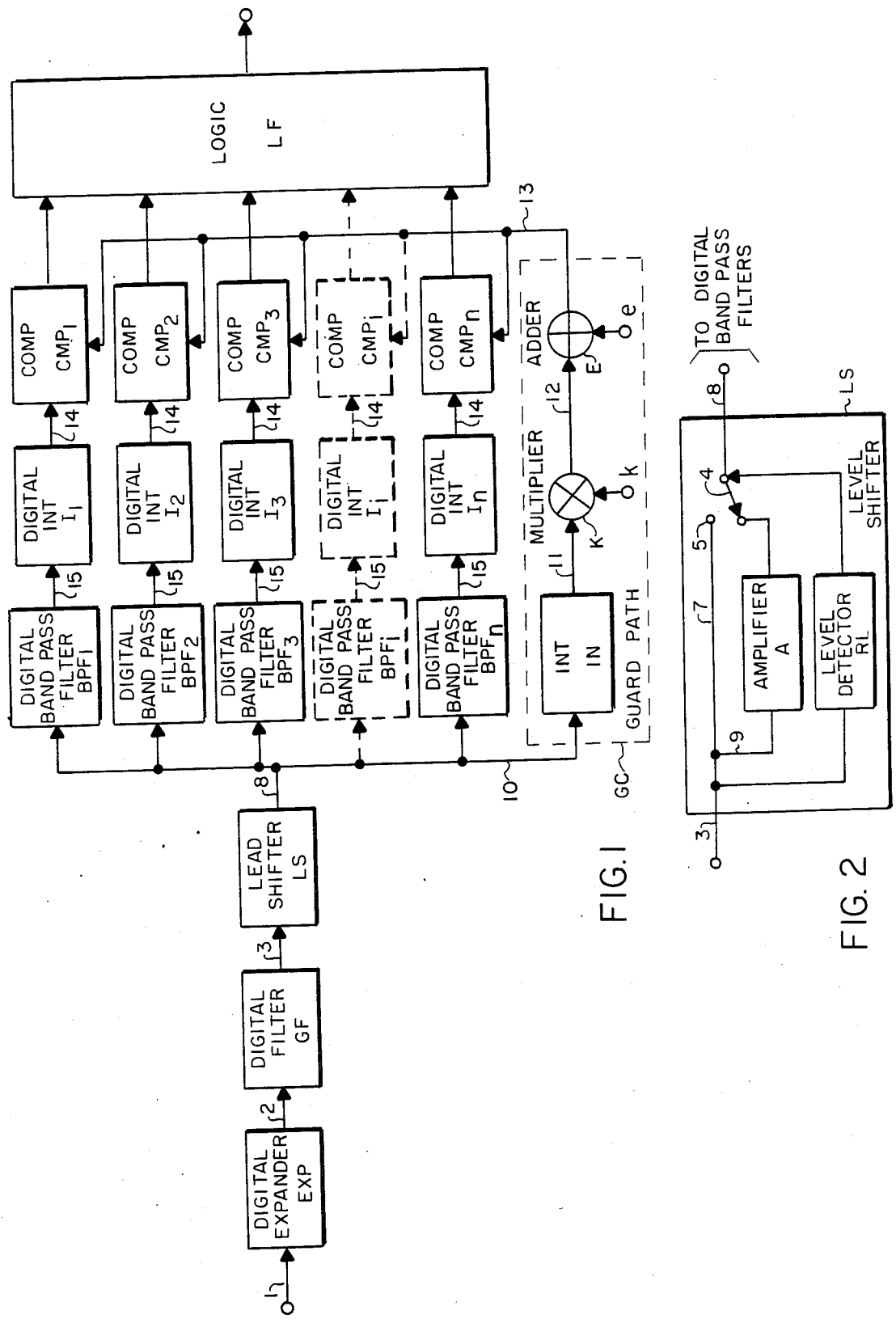

DIGITAL MULTIFREQUENCY SIGNAL RECEIVER

FIELD OF THE INVENTION

The present invention relates to a digital exchanges and particularly to digital circuits intended for receivers for telephone band multifrequency signalling systems, i.e. CCITT (Comité Consultantif International Télégraphique et Téléphonique) signalling systems of R1, R2, No5, DTMF type. cBACKGROUND OF THE INVENTION The basic problem with receivers for digital multifrequency signalling systems is that of the limits imposed by the operation and release times. Another problem is that that the cost of the components becomes a substantial factor in the case of digital systems.

There are at present known in the art analog multifrequency receivers in which the signal is at the beginning filtered to eliminate noise signals; then it passes through an automatic gain control circuit, which compresses the dynamics of the input multifrequency signal; then it passes through suitable band pass filters which are centered to each frequency to be selected and thereafter through integrator circuits, which extract the average value of the output signal of each band pass filter; the signals are then compared with a fixed threshold to detect the desired multifrequency signals and processed in a logic circuit for the final decoding of the multifrequency signals.

More recently, in order to reduce the size and energy consumption there have been developed digital multifrequency receivers controlled by a processor in which the compressed PCM signal is first linearized in a digital expander circuit, then it is filtered in a digital group filter, it passes through an automatic gain control circuit, it passes through 4th order digital band pass filters, integrator circuits, fixed threshold comparators and a final logic for decoding the multifrequency signals.

These presently used systems, however, have various disadvantages. The analog systems have sizes and energy consumptions which heavily burden the whole system. The presently used systems also have a tendency to notably lengthen the recognition time of the multifrequency combination and therefore make more difficult the full compliance with the CCITT recommendations on the operation and release times; in addition they take a high percentage of the available processing time.

In addition, the presently used systems are notably expensive both as the whole system and because of the use of special components, such as, for example, digital multipliers with a high number of bits.

SUMMARY OF THE INVENTION

It is therefore an object of the present invention to obviate these and other disadvantages of the prior art digital detector devices for telephone band multifrequency signalling.

More particularly, the digital detector device for telephone band multifrequency signalling according to the invention, of the type adapted to effect a filtering and a threshold comparison, is characterized in that it comprises a level shifter having the input connected to the output of a digital filter and a guard path circuit having the input connected to the output of the level shifter and its output connected to a first input of each of the comparator circuits which are a part of the detectors of the individual frequencies which receive at a second input, through an integrator circuit, the output signal of a digital band pass filter centered to the frequency to be detected. The guard path circuit comprises serially connected to one another, an integrator circuit adapted to provide at its output the square of the root-mean-square value of the input signal, a multiplier adapted to multiply the input signal by a predetermined value, and an adder circuit adapted to add the signal to a fixed threshold value so as to obtain at a first input of the comparator circuits a variable threshold in dependance on the level of the incoming signal.

According to a feature of the invention the digital band pass filters are of an order lower than the 4th.

The digital devices according to the invention makes it possible to use a simple specialized microprocessor for processing the signals, thus avoiding the use of digital multipliers.

This is possible because the invention achieves a minimization of the processing time due to the elimination of the automatic gain control circuits and the reduction of the degree of complexity of the band pass filters with respect to the prior art systems.

A further advantage achieved by means of the elimination of the automatic gain control circuit is the provision of a structure which is very fast in the recognition of the multifrequency combination and therefore makes it possible to comply with the CCITT recommendation on the operation and release times with an adequate margin.

BRIEF DESCRIPTION OF THE DRAWING

These and other features of the invention will be more apparent from the following description of one embodiment of the invention, given by way of example and in no limiting sense, referring to the accompanying drawings in which:

FIG. 1 is a block diagram of the digital device according to the invention; and

FIG. 2 is a detail block diagram of the device designated LS in FIG. 1.

DESCRIPTION OF THE PREFERRED EMBODIMENT

In FIG. 1 the block labeled EXP indicates a conventional digital expander; GF indicates a conventional digital filter; LS is a level shifter described afterwards; the blocks labeled BPF are conventional digital band pass filters of the 2nd order; the I indicates a digital integrator circuit adapted to extract the average value of the input signal 15; while block CMP indicates a conventional comparator circuit.

The block designated IN is an integrator circuit adapted to give at its output the square of the root-mean-square value of the input signal 10; K indicates a conventional digital multiplier adapted to multiply the input signal 11 by a predetermined value k; E indicates an adder circuit adapted to add the input signal 12 to a fixed threshold value ε; LF indicates a final logic for processing in a known manner the output signals of the receiver.

The block GC comprising the circuits IN, K and E is a single member referred to as a guard path circuit.

Referring to FIG. 2, in it block RL indicates a level detector adapted to control a switch 4 on the terminals 5 or 6 according to the signal received by RL.

A indicates a conventional fixed value amplifier.

The operation of the device is as follows (FIG. 1):

An incoming 8 bit compressed signal on wire 1 undergoes in EXP an expansion whereby the output signal on wire 2 has 16 linear bits.

These signals are digitally filtered in digital filter GF so as to eliminate the noise signals.

The output signals from the digital filter GF on a wire 3 pass to the level shifter LS and more particularly to the level detector RL (FIG. 2).

If the signal reaches a predetermined threshold the switch 4 is positioned on to terminal 5 and therefore the signal is sent through the conductor 7 to the output 8 unchanged.

If instead the signal does not reach a predetermined threshold level the switch 4 is positioned on to terminal 6 and the input signal reaches the output 8 through a wire 9 and the amplifier A.

Said threshold is positioned at an intermediate value of the admitted levels whereby it compresses the dynamics of the multifrequency signal at the input of the level shifter LS.

This compression of the dynamic range of the multifrequency signal increases the accuracy required for the processing of the low level signals without having recourse to a more expensive and complex automatic gain control system.

In addition, the provision of a level shifter LS associated with the guard path circuit GC in place of the automatic gain control circuits makes it possible to recognize with adequate margin the multifrequency combination in the operation and release times recommended by CCITT.

The output signal on the wire 8 is sent among other things on a conductor 10 to the guard path circuit GC and more particularly to the integrator filter IN. At the output 11 there is, as already stated, the square of the root-mean-square value of the signal on the wire 10.

The output signal at the output 11 is then multiplied in K by a suitable guard factor k which is predetermined according to the used signalling system.

The output signal from multiplier K on the wire 12 is added in the adder E to a fixed threshold $\epsilon$, it too is predetermined on the basis of the signalling system's characteristics.

The output signal on the wire 13 will be a variable threshold signal depending on the input signal on the conductor 10.

The output signal from the level shifter LS on the wire 8 is also sent to the digital band pass filters of the 2nd order BPF1, BPf2, BPF3, . . . BPFn which are centered on the frequency to be detected and then, through the wire 15, to the integrators I1, I2, I3, . . . In which extract, as already stated, the averge value of the signal at the output of each pass band filter.

The incoming signal on wire 14 reaching the comparators CMP1, CMP2, CMP3, . . . CMPn is the average value of the output signal from the band pass filters, and the signal on wire 13 reaching the same comparators is the output signal from the guard path circuit GC.

It therefore appears apparent that the function of the guard path circuit is to provide a variable threshold that makes possible a filtering action in addition to that effected by the band pass circuits BPF.

In this manner it is possible to use band pass filters BPF of an order lower than a 4th order, in the example under consideration they are of the 2nd order, and still provide an overall filtering action comparable with that given by considerably more complex circuits.

In addition the provision of digital filter BPF of an order lower than the 4th allows a reduction of the processing times.

The signals compared in comparators CPM1, CPM2, CPM3, . . . CPMn are sent to the logic LF where they are processed in a well known manner.

In order to better understand the invention it will be described now with a practical example of the use of the digital device according to the invention.

Assume that we use the R2 multifrequency signalling system that specifies the use of the following signalling frequencies:

R2 Backward 540, 660, 780, 900, 1020, 1140 Hz
R2 Forward 1380, 1500, 1620, 1740, 1860, 1980 Hz In such a case the CCITT recommendation are the following:

(1) Tolerance for the frequencies is ±10 Hz
(2) Absolute power levels ($L_1$, $L_2$) for each of the two frequencies of a signal are;

$$-35 \leq L_1 \leq -5 \text{ dBm}$$

$$-35 \leq L_2 \leq -5 \text{ dBm}$$

(3) Level differences between two signal frequencies are:
   (3a) for adjacent frequencies/$L_1 - L_2 / \leq 5$ db
   (3b) for nonadjacent frequencies/$L_1 - L_2 / \leq 7$ db
(4) Nonoperate and nonrecognition requirements
   (4a) one or two pure sine waves in the 300 to 3400 Hz band, each with a power level of $-42$ dBm
   (4b) two signalling frequencies with a level difference/$L_1 - L_2 / \geq 20$ dB
(5) Operation and release times
   $T_O + T_R \leq 80$ msec
   $T_O$ = operation time
   $T_R$ = release time The function of the block LS is to compress the dynamics of the signal consisting of one or more frequencies which is present on the wire 3. The block LS passes unaltered the signal at its input if it has an absolute power level $\geq -13$ dBm or else amplifies it by 12 db. This compression of the dynamic range of the signal on the wire 3 increases the accuracy of the processing of the signal at low levels.

In the case of the R2 signalling system the guard factor k is equal to 0.35 and its function is to permit the recognition of the multifrequency combination if the level difference between the two frequencies of a signal is within the limits recommended by CCITT (see CCITT recommendation at point 3) and not to permit the recognition of the multifrequency combination if the level difference between the two frequencies is out of the limits recommended by CCITT (see CCITT recommendations at point 4b).

The fixed threshold $\epsilon$, is always equal to 0.023 in the R2 signalling system, and its function is to discriminate the low signal levels out of the range admitted by the CCITT recommendations (see CCITT recommendation at point 4a).

The combined action of the guard path circuit GC and the level shifter LS thus permits the elimination of the automatic gain control circuit AGC and the reduction of the order of the band pass filters BPF with respect to the prior art systems.

The elimination of the AGC has made it possible to provide a structure much faster with respect to the existing ones and has therefore made it possible to comply with the CCITT recommendation regarding the operation and release times (see CCITT recommendation at point 5). The reduction of the order of the band pass filters BPF with respect to the prior art systems has permitted the minimization of the processing time and therefore has given the possibility of providing a digital multifrequency receiver for a channel with a simple microprocessor adapted for digital filtering, i.e. very fast in effecting products additions. This solution has also made it possible not to use special components such as digital multipliers which are both expensive and cumbersome.

While but one embodiment of the invention has been described and illustrated, it is obvious that a number of changes and modifications can be made without departing from the spirit and scope of the invention.

What is claimed is:

1. A digital detector device for telephone band multifrequency signalling comprising:
   a digital filter having an input to which the signal source is connected and an output,
   a level shifter amplifier having an input connected to the output of said digital filter and an output,
   a plurality of individual frequency detectors each having a first and a second input and an output,
   said frequency detectors each comprising;
   a band pass filter connected to the output of said level shifter,
   a digital integrator and,
   a comparator connected in series,
   a guard path circuit comprising an integrator, a digital multiplier and an adder circuit, in series, an input to said integrator connected to the output of said level shifter, and an output connected to the second input of each of said comparator circuits,
   said output comprising a variable reference level for said signal comparison in said comparator circuits.

2. An arrangement as claimed in claim 1, characterized in that said level shifter comprises;
   an amplifier,
   a level detector and,
   a two way switch,
   said level detector operatively connected to control said switch to connect said amplifier into the signal path upon detecting an incoming signal below a designated level.

3. An arrangement as claimed in claim 2, characterized in that said level detector is operated to disconnect said amplifier from said signal path upon detecting an incoming signal above a second designated level.

4. An arrangement as claimed in claim 1, characterized in that said band pass filters are of an order lower than the 4th order.

5. An arrangement as claimed in claim 2, characterized in that said band pass filters are of an order lower than the 4th order.

6. An arrangement as claimed in claim 3, characterized in that said band pass filters are of an order lower than the 4th order.

7. An arrangement as claimed in claim 1, characterized in that said digital filter is comprised of a microprocessor.

8. An arrangement as claimed in claim 4, characterized in that said digital filter is comprised of a microprocessor.

9. An arrangement as claimed in claim 1, characterized in that said band pass filter is comprised of a microprocessor.

10. An arrangement as claimed in claim 7, characterized in that said band pass filter is comprised of a microprocessor.

11. An arrangement as claimed in claim 1, characterized in that said multiplier and adder circuits are comprised of a microprocessor.

12. An arrangement as claimed in claim 9, characterized in that said multiplier and adder circuits are comprised of a microprocessor.

* * * * *